Patented June 7, 1932

1,862,336

UNITED STATES PATENT OFFICE

ISRAEL JOHN DRESCH, OF TOLEDO, OHIO, ASSIGNOR TO PROSTHETIC PRODUCTS, INC., OF NEW YORK, N. Y., A CORPORATION OF NEW YORK

ARTIFICIAL DENTURE AND MANUFACTURE THEREOF

No Drawing.         Application filed October 22, 1931. Serial No. 570,508.

This invention relates to improvements in dental plates or artificial dentures and to improvements in the process of producing such dentures. More particularly the invention relates to artificial dentures comprising resins of the glyptal or glycerinephthalic anhydride type and to an improved process which makes the manufacture of artificial dentures comprising resins of this type practicable.

It is an important object of the invention to provide an artificial denture having superior esthetic, hygienic and mechanical properties and an extremely low water-absorption ratio and which will maintain these properties over prolonged periods of time. It is a further object to provide an improved process by means of which artificial dentures possessing these properties can be manufactured at a cost consistent with the practical application of material possessing the requisite properties for this purpose.

The ideal material for this purpose should be translucent, possess a high luster and have a uniformly fine smooth texture. It should be free from unstable or deleterious organic materials and have a high shattering strength. Also, it must have an extremely low water-absorption ratio and should be sufficiently stable to preserve these properties after prolonged exposure to air, moisture and severe mechanical stresses. Moreover, to render practical the use of such a material in an artificial denture, it must be capable of being formed accurately into intricate shapes of widely varying thicknesses at a cost which will not render its use for this purpose prohibitive.

Resins of the glycerine-phthalic anhydride type, when thoroughly cured, possess the desired esthetic properties and have a high shattering strength. However, the use of this type of resin in an artificial denture heretofore has not been practical for a number of reasons. Resins of the glycerine-phthalic anhydride type differ from the more common type of phenolic resins, which can be readily cured in metallic molds under pressure, in that the former must be subjected to prolonged heat treatment, for example for about 48 hours, at a temperature of approximately 350° to 360° F. in order to secure the requisite stability and low water-absorption ratio. During this prolonged heat treatment a substantial quantity of volatile constituents are driven off which tends to cause excessive shrinkage of the mass being cured. For these reasons the glycerine-phthalic anhydride type of resins are generally produced, in a thoroughly cured state, only in relatively large slabs from which articles of various shapes are subsequently formed by machining. Attempts to thoroughly cure resins of this type under pressure in the usual metallic molds have proved entirely unsatisfactory.

I have attempted to cure artificial dentures consisting of resins of the glycerine-phthalic anhydride type under pressure in molds composed of a porous material, for example in a plaster of Paris mold, which will permit volatile constituents to be driven off. However, although such attempts have produced a thoroughly cured product, they have been generally unsatisfactory due to the fact that internal stresses set up in the irregularly shaped denture during the prolonged curing treatment, caused such an extremely high percentage of failures in the final molded and cured article, due to cracking and checking, as to render the cost of production prohibitive. This checking and cracking during the prolonged heat treatment may be the result of non-uniform curing, due to the poor heat conductivity of the resins, or it may be entirely the result of internal strains set up by the excessive shrinkage caused by evaporation of volatile constituents in the resins during the prolonged curing treatment.

I have discovered that finely divided inorganic fillers may be incorporated and uniformly distributed through resins of this type prior to the final prolonged curing treatment, in quantities insufficient to destroy the translucent properties and the natural luster of the cured product, and the mixture so produced thereafter molded in the form of a denture and subjected, in a porous mold under pressure, to a sufficiently prolonged and severe curing treatment as to procure the requisite stability and low water-absorption ratio in the final cured article without encountering the excessive cracking and checking during the curing operation that has heretofore made the use of resins of this type for this purpose impractical and prohibitively expensive.

Various forms of inorganic material may be employed as a filler so long as they are resistant to heat, have a very low water-absorption ratio, do not affect the resin or the coloring matter used to duplicate the color of the live tissues, and can be prepared in a state of extremely fine subdivision. Preferably the filler itself should be translucent. Fused quartz or mica in a finely divided state has been satisfactorily employed and are given as examples. The filler should be incorporated in the resin in an extremely fine state of subdivision and uniformly distributed therethrough in order for the final product to have the desired uniformly smooth texture and to retain the desired translucency and natural luster.

The amount of inorganic filler may be varied to a considerable extent, so long as the final product retains the requisite translucency and natural luster. In general the amount of filler employed should be as small as possible consistent with the prevention of excessive cracking and checking during the final curing treatment. I have found that by incorporating 10–30% of finely divided quartz or mica in a glycerine-phthalic anhydride resin, very satisfactory results may be obtained although the amount of filler employed may be either somewhat more or somewhat less than this value. The filler may be incorporated in the resin while the latter is in a liquid state or after the resin has been given an initial set and then ground into a powder or granular form for use in the porous molds.

Artificial dentures embodying the present invention are translucent and possess a natural luster resembling that of live tissues. Further, they have an extremely low water-absorption ratio and high shattering strength and will retain all of these properties when exposed to air or in actual service as a denture over prolonged periods of time.

I claim:

1. In an artificial denture, an improved translucent water-resistant product comprising a glycerine-phthalic anhydride resin having 10–30% of an inert inorganic filler in a finely divided state uniformly distributed therethrough, said inert filler being heat resistant and having a low water absorption ratio.

2. In an artificial denture, an improved translucent water-resistant product comprising a glycerine-phthalic anhydride resin having a relatively small amount of an inert inorganic filler in a finely divided state uniformly distributed therethrough, said inert filler being heat resistant and having a low water absorption ratio.

3. In an artificial denture, an improved water-resistant product comprising a glycerine-phthalic anhydride resin having a relatively small amount of an inert translucent inorganic filler in a finely divided state uniformly distributed therethrough, said inert filler being heat resistant and having a low water absorption ratio.

4. In an artificial denture, an improved water-resistant product comprising a glycerine-phthalic anhydride resin having approximately 10–30% of an inert translucent inorganic filler in a finely divided state uniformly distributed therethrough, said inert filler being heat resistant and having a low water absorption ratio.

5. In a process for producing artificial dentures, the improvement comprising uniformly dispersing a small amount of a finely divided inert inorganic filler through an incompletely cured glycerine-phthalic anhydride resin, molding the mixture so produced in the form of a denture and subjecting the molded product while confined in a porous mold to a prolonged heat treatment to fully cure the resin and convert the composite resin mixture into a translucent water-resistant product.

In testimony whereof I affix my signature.

ISRAEL JOHN DRESCH.